United States Patent [19]

Maeda et al.

[11] Patent Number: 5,830,415
[45] Date of Patent: Nov. 3, 1998

[54] FILTER MEMBER FOR PURIFYING EXHAUST GAS AND METHOD FOR MANUFACTURING THE SAME

[75] Inventors: Takao Maeda; Masayuki Ishii; Hiroshi Yoshino; Shunsuke Ban, all of Itami, Japan

[73] Assignee: Sumitomo Electric Industries, Ltd., Japan

[21] Appl. No.: 390,995

[22] Filed: Feb. 21, 1995

Related U.S. Application Data

[63] Continuation-in-part of Ser. No. 244,281, filed as PCT/JP93/01308, Sep. 3, 1993, abandoned.

[30] Foreign Application Priority Data

Sep. 14, 1992 [JP] Japan ................................. 4-271137
Sep. 14, 1992 [JP] Japan ................................. 4-271138

[51] Int. Cl.$^6$ ............................ B01D 50/00; C22C 19/05
[52] U.S. Cl. ..................... 422/171; 422/177; 422/180; 422/211; 422/222; 55/525; 55/DIG. 30; 428/605; 428/613; 502/439; 502/527; 420/442; 420/443; 420/444; 420/460
[58] Field of Search ................................. 422/171, 177, 422/180, 211, 222; 428/605, 613; 502/315, 256, 319, 259, 335, 314, 439, 327, 527; 55/525, 526, DIG. 30; 29/890; 420/442, 443, 444, 460

[56] References Cited

U.S. PATENT DOCUMENTS 3,944,504  3/1976  Ford et al. ............................. 502/527
4,969,960 11/1990  Lehnert et al. ......................... 502/439
4,983,467  1/1991  DeBruyne et al. ...................... 428/605
5,165,899 11/1992  Delaunay et al. ...................... 422/180

FOREIGN PATENT DOCUMENTS

0211233A1  2/1987  European Pat. Off. .
0232793A1  8/1987  European Pat. Off. .
0315896A1  5/1989  European Pat. Off. .
0450897A2 10/1991  European Pat. Off. .

OTHER PUBLICATIONS

Patent Abstracts of Japan, vol. 17, No. 355 (C–1079) (1993).
Database WPI, Section Ch, Week 9314, Derwent Publications, AN 93–112103(1993).

*Primary Examiner*—Robert J. Warden
*Assistant Examiner*—Hien Tran
*Attorney, Agent, or Firm*—Wenderoth, Lind & Ponack

[57] ABSTRACT

The present invention provides a car exhaust purifying filter member which is high in the capacity to collect solid and liquid contents in exhausts and which has such high heat resistance as to be capable of withstanding heat when burned for cleaning and a method of manufacturing the same. A three-dimensional mesh-like metallic porous member made from Ni—Cr—Al and having a three-dimensional framework is heated at 800–1000 ° C. in the atmosphere to form on its surface a densely grown fibrous alumina crystal. This member is used as a filter member. Such a filter member shows excellent collecting capacity and corrosion resistance and can withstand high temperatures. Also, it is possible to firmly carry a catalyst on the fibrous alumina crystal formed on the surface. Because of its increased surface area, it has an increased catalyst carrying capacity.

7 Claims, 3 Drawing Sheets

20μm

10μm

10 μm

FILTER MEMBER FOR PURIFYING EXHAUST GAS AND METHOD FOR MANUFACTURING THE SAME

BACKGROUND OF THE INVENTION

This application is a continuation-in-part application of U.S. patent application Serial No. 08/244,281 filed on May 13, 1994, now abandoned which is a 371 of PCT/JP 93/01308 filed Sep. 13, 1993.

This invention relates to a filter member for purifying exhausts for use in an exhaust purifying device of an automobile or a kerosene fan heater and method for manufacturing the same.

Particulates (solid components such as soot) discharged from diesel-powered vehicles are becoming a big social problem. Automobile manufacturers are endeavoring to develop filter systems which can effectively collect such particulates. Among them, there is known a filter formed of honeycomb-shaped cordierite ceramics. This filter can collect particulates with high efficiency but has a problem in that it tends to develop heat spots, melting or cracks when heated to remove the collected particulates and regenerate the filter. Thus, a complicated control system was needed.

A diesel engine car is advantageous over a gasoline-powered car in that the fuel cost is lower. But this advantage will be offset if the cost for treating exhaust is high. Thus, it is desired to develop a filter member which is high in particulate-collecting capacity and resistant to heat and requires no special protective means.

In an exhaust purifying device for use in cars or kerosene fan heaters is used a catalyst made of a precious metal (such as platinum) to purify exhausts by chemically reacting them.

Such a catalyst is provided on the surface of a honeycomb-shaped carrier made of cordierite. Such a conventional carrier has a relatively smooth surface and thus is low in catalyst carrying capacity.

On the other hand, today's automobiles and kerosene fan heaters tend to discharge higher-temperature exhausts than ever before as a result of technological advancements in burning fuel in an automotive engine or burning kerosene in a burner. One problem with a conventional carrier is that it cannot maintain its exhaust purifying effect for so long a period of time because the catalyst tends to peel off during use if the carrier is repeatedly heated and cooled.

It is therefore an object of this invention to provide a filter member for purifying exhaust gas which is resistant to heat and high in particulate-collecting capacity and which can stably carry its catalyst even if repeatedly heated and cooled in a high-temperature environment or subjected to vibrations, and a method of manufacturing the same.

SUMMARY OF THE INVENTION

In order to solve the above problems, according to this invention, there is provided a filter member comprising a three-dimensional mesh-like metallic porous member having a three-dimensional framework and made from a heat-resistant material, preferably an Ni—Cr—Al material, and a fibrous alumina crystal provided on the surface of the three-dimensional framework.

The filter member for purifying exhaust gas according to this invention comprises the above-mentioned filter member as a carrier, and a catalyst carried thereon by sticking it on the crystal on the surface of the framework of the carrier.

The three-dimensional mesh-like porous member used in the present invention is formed from an Ni-based alloy (made by Sumitomo Electric Ind., Ltd.; trade name: CERMET). It is formed by subjecting an urethane foam to conductivity-imparting treatment, plating the urethane foam with Ni to outline the framework of the porous member, and removing the urethane foam by burning it. The main component of the porous member thus formed is therefore Ni. But if it were made solely from Ni, it could not withstand temperatures higher than 700° C. Such a member would suffer premature corrosion if exposed to exhausts because exhausts contain highly corrosive $SO_2$ gas.

According to the present invention, such elements as chromium, aluminum, and rare earth elements (yttrium, neodymium, etc.) are diffused or doped into the three-dimensional mesh-like porous member made of Ni to convert the pure Ni member into a Ni-based alloy. By adding trace amounts of such elements to Ni, Ni can be alloyed so that the porous member will show improved heat resistance and corrosion resistance. The alloy thus formed may be a nickel-chromium-aluminum alloy. Rare earth elements such as yttrium and neodymium may be further added to the surface layer of such alloy in trace amounts of 0.1% or less by PVD (physical deposition) such as electron beam deposition, sputtering or ion plantation. Further, these elements may be diffused further deep into the alloy in an inert atmosphere or a hydrogen reducing atmosphere. The contents of rare earth elements such as yttrium and neodymium can be easily reduced to 0.1% or less by mixing these metals into a material powder in a diffusing agent to 0.2 wt % or less and diffusing them into the material powder at a temperature of 1000° C. or higher.

The results of a running test revealed that the alloy member thus formed maintains sufficient strength at temperatures higher than 700° C., is less likely to be oxidized in a high-temperature oxidizing atmosphere, and has all properties required for media for trapping particulates in exhausts, such as high heat resistance and high corrosion resistance at high temperatures.

If the three-dimensional mesh-like metallic porous member is made from an Ni—Cr—Al material, the fibrous or needle-like alumina crystal on the surface of the three-dimensional framework can be formed easily by heating the porous member to 800°–1000° C., preferably 820°–970° C., in the atmosphere or in an oxidizing atmosphere (e.g. in a mixture of Ar and $O_2$ gases).

The three-dimensional mesh-like metallic porous member made of an Ni—Cr—Al material is obtainable by alloying a three-dimensional mesh-like porous member made of Ni by diffusing Cr and Al therein. The diffusion conditions (powder composition, powder amount, temperature and time) may be selected so that the porous member obtained will have such a composition that Cr: 15–40% by weight, Al: 1–8% by weight, with the remainder being Ni and inevitable impurities. It is possible to improve the heat resistance of the filter member if 0.05–0.5% by weight of one or more of rare earth elements such as yttrium and neodymium are contained in the composition.

The fibrous alumina crystal on the surface of the three-dimensional framework is heat-resistant enough to withstand a temperature of 1000° C. or higher.

The fibrous alumina crystal on the three-dimensional framework serves to roughen the surface of the three-dimensional framework, so that any solid or liquid components in exhausts are collected onto the surface of the three-dimensional framework.

In the three-dimensional mesh-like metallic porous member formed by alloying Al together with Cr, $Al_2O_3$ forms a stable oxide resistant to the attack of sulfur and sulfuric components. Thus, the filter member obtained shows high corrosion resistance even if exposed to car exhaust.

With filter members having a catalyst, the catalyst is firmly carried by the porous member because it sticks to the alumina fiber on the surface of the three-dimensional framework. Thus, even if the filter member is repeatedly heated and cooled in a high-temperature environment or subjected to vibrations, the catalyst is less likely to peel off.

Moreover, since the surface of the framework has a complicated shape, the filter member can carry a large amount of catalyst and thus have an increased physical capacity to collect solid components in exhaust.

We will now set out the reasons why the components of the Ni—Cr—Al type three-dimensional mesh-like metallic porous material should have their contents restricted.

Cr is a basic element necessary to ensure high resistance to heat and oxidation. According to the present invention, an alumina ($Al_2O_3$) film mainly serves to insure resistance to oxidation. But if the content of Cr is too low, the adhesion and protectiveness of the film will drop, thus making it difficult to maintain high oxidation resistance. On the other hand, excessive Cr will reduce the toughness of the filter member. The content of Cr should be between 15 and 40% by weight to avoid both of the problems.

In order to keep high heat resistance, Al should be contained in the amount of at least 1% by weight. If less than 1% by weight, the heat resistance would be insufficient. More than 8% by weight of Al is undesirable from the viewpoint of workability. Thus, the content of Al should be 1–8% by weight. The actual content of Al should be determined within the above range taking into consideration the required degree of workability.

The Ni—Cr—Al type three-dimensional mesh-like metallic porous member may be formed by subjecting a three-dimensional mesh-like metallic porous material made solely of Ni to a diffusion treatment known as chromizing to form an Ni—Cr type three-dimensional mesh-like metallic porous member, forming it to the shape of a pipe and then subjecting this porous member to calorizing (two-stage alloying). Otherwise, it may be manufactured by forming a pure Ni-type three-dimensional mesh-like metallic porous member into a pipe shape and then subjecting it to a single-stage alloying treatment in which Cr and Al are diffused at one time. Depending on the conditions of treatment, it is possible to further improve the heat resistance of surface by increasing the amount of Al alloy near the surface of the framework. But in this case too, the content of Al in the entire alloy should be from 1 to 8% by weight at most. If more than 8%, the shock resistance and toughness of the filter member would be insufficient even at its surface.

We have found out that the fibrous alumina crystal grows when Al is diffused in the surface and inside of the framework of the three-dimensional mesh-like metallic porous member and the porous member is subjected to a specific heat treatment in the atmosphere or in an oxidizing gas atmosphere containing oxygen. It is possible to diffuse Al from the surface of the framework to any desired depth by controlling the diffusion time during calorizing. It is preferable to control the content of Al so that it is high near the surface of the framework to facilitate the growth of crystal and, inside the framework, the Al content should be kept at a value necessary to keep high heat resistance (1% by weight).

If it is desired to increase the aspect ratio (length-to-thickness ratio) of the fibrous alumina crystal, this is attained by increasing the content of Al to 5% or more in the region from the surface of the framework to the depth of 0.5 $\mu$m. It is possible to control the content of Al near the surface of the framework e.g. by subjecting a three-dimensional mesh-like metallic porous member made from Ni to chromizing to provide an Ni—Cr type three-dimensional mesh-like metallic porous member, and then subjecting the thus obtained porous member to calorizing to form a surface region where the Al content is high. Otherwise, it is also possible to provide a pure Al metal coating on the surface of the three-dimensional framework by vapor plating such as vacuum deposition or wet plating, and then subjecting it to diffusion treatment in an inert atmosphere.

If such an Ni—Cr—Al type three-dimensional mesh-like metallic porous member contains rare earth elements such as yttrium and neodymium, it will show still higher heat resistance. Such rare earth elements should be added in the form of powder into the material during chromizing or calorizing or the first-stage alloying. But if they were added in the amount of more than 0.5% by weight, they would prevent the growth of fibrous crystal in the subsequent process. If less than 0.05% by weight, the heat resistance scarcely improves.

The temperature for growing a fibrous alumina crystal in the atmosphere or in an oxidizing atmosphere should be between 800° and 1000° C. (preferably between 820° and 970° C.). Otherwise, a fibrous crystal having a sufficiently large aspect ratio is not obtainable. In order to grow a fibrous crystal having a large aspect ratio, the most preferable temperature is 850°–950° C. If the heating temperature is 850° C., the heating time required will be 10 hours or more. If heated at 950° C., the heating time can be reduced to two hours. If heated at 1000° C. or higher, the oxide film obtained would develop a practically flat surface, so that its specific surface area would be too small to collect exhaust components sufficiently. If lower than 800° C., oxidation process would be delayed due to a delay in diffusion of atoms. Thus, a long heating time is required to grow desired whiskers.

The catalyst to be carried on the three-dimensional mesh-like metallic porous member having the fibrous alumina crystal according to the present invention may be formed in the following ways:

(1) Fire-resistant alumina powder is wet-ground to form a slurry. A three-dimensional mesh-like metallic porous member having a fibrous alumina crystal is immersed in the slurry thus formed. After removing excess slurry and drying at 80°–250° C., the three-dimensional mesh-like metallic porous member having a fibrous alumina crystal is baked at 400°–850° C. to form a filter member carrying a catalyst for purifying exhausts.

(2) Titania powder is mixed in an aqueous solution containing predetermined amounts of platinum and palladium and then baked and dried at 80°–250° C. to carry the platinum-palladium component on the titania. The titania powder carrying platinum-palladium components is wet-ground to form a slurry. A three-dimensional mesh-like metallic porous member having a fibrous alumina crystal is immersed in the slurry thus formed. Then, after removing excess slurry, it is dried at 80°–250° C. and then baked at 400°–850° C. to form the intended filter member carrying a catalyst for purifying exhaust.

If platinum is used as a starting material for the catalyst, it is preferably in the form of an aqueous solution of salt such as chloroplatinic acid or dinitrodiamine platinum. If palladium is used, it may be in the form of palladium nitrate, palladium tetramine chloride or palladium sulfide complex salt.

It is known through experience that a precious metal catalyst such as platinum should be carried in the amount of 0.05 g or more per liter of the filter volume in order for such metal to act as a catalyst. Thus, the catalyst carrier has to have a sufficient carrying capacity.

In order to improve the high-temperature durability and to control the oxidizing capacity, oxides of at least one element selected from the group consisting of rare earth elements such as scandium, yttrium, lanthanum and neodymium, and at least one element selected from the group consisting of alkaline metals such as lithium and sodium may be added to the catalyst component if necessary.

As described above, the filter member according to this invention is manufactured by forming a fibrous alumina crystal on the surface of the three-dimensional framework of a three-dimensional mesh-like metallic porous member made from a heat-resistant Ni—Cr—Ar type alloy. Such a filter exhibits a high capacity for collecting solid and liquid components in exhaust. Also it can sufficiently withstand temperature changes when repeatedly heated and cooled in a high-temperature environment. Thus, it is regeneratable at low cost simply by burning it.

In an arrangement where a catalyst is used, the catalyst is firmly carried on the surface of the framework because it is entangled with the fibrous alumina crystal. Such a catalyst is less likely to peel off even if the filter is repeatedly heated and cooled or subjected to vibrations.

Also, because of its three-dimensional structure, the filter member has an increased surface area, so that it is possible to carry a greater amount of catalyst thereon. This leads to an improved exhaust purifying capacity by the catalyst. Further, such a high exhaust purifying capacity can be maintained for a prolonged period of time. The filter according to the present invention exhibits a high physical capacity for purifying exhaust.

Other features and objects of the present invention will become apparent from the following description made with reference to the accompanying drawings, in which:

DETAILED DESCRIPTION OF THE PREFERRED EMBODIMENT

Now we will describe examples of this invention.

(EXPERIMENTAL EXAMPLE 1)

A three-dimensional mesh-like metallic porous member made of Ni having an amount of 1100 g/m$^2$ and having 50 cells per inch was subjected to alloying by the diffusion process in a powder layer which was a mixture of ammonium chloride powder and metallic aluminum powder to provide an Ni—Cr (25% by weight)—Al (6% by weight) type three-dimensional mesh-like metallic porous member. The porous member thus obtained was heated at 875° C. for five hours in the atmosphere to provide a filter member (Article 1 according to the present invention) formed with a fibrous alumina crystal on the surface of its framework.

Figure 1:
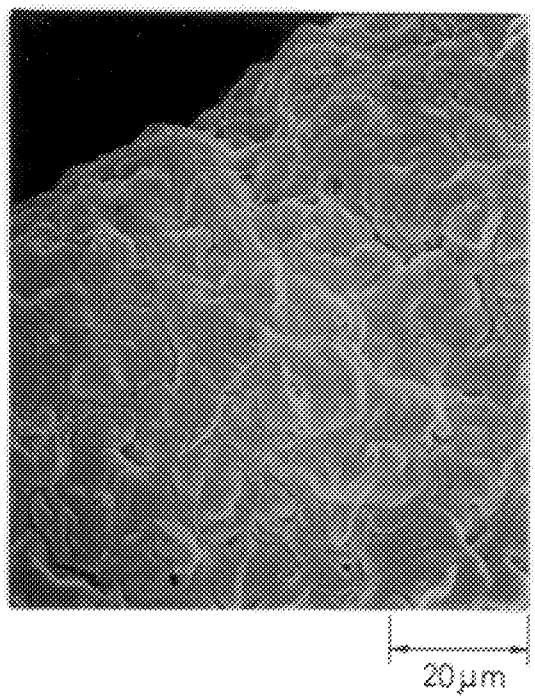
FIG. 1 is a scanning electron microscopic photograph showing the surface condition of the framework of an Ni—Cr (25% by weight)—Al (6% by weight) type three-dimensional mesh-like metallic porous member.
Figure 2:
FIG. 2 is a scanning electron microscopic photograph showing the surface of the framework of the filter member according to this invention formed of the three-dimensional mesh-like metallic porous member shown in FIG. 1.
Figure 3:
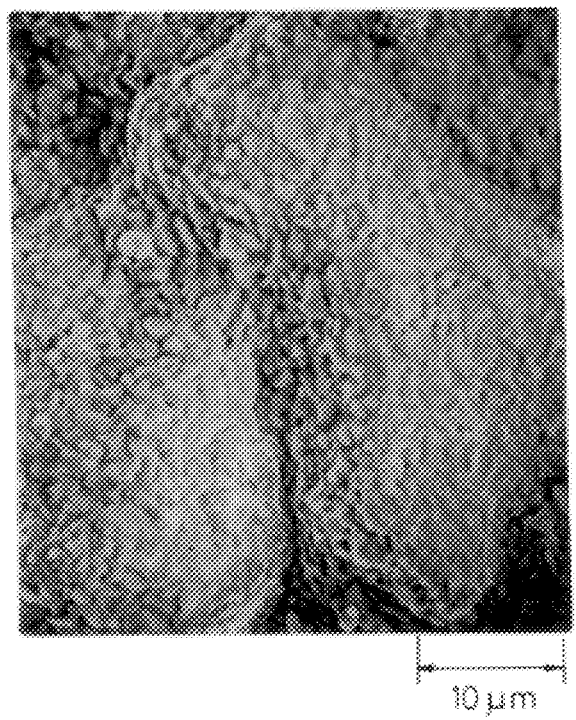
FIG. 3 is a scanning electron microscopic photograph showing the surface of the framework of a comparative filter member formed of the three-dimensional mesh-like metallic porous member shown in FIG. 1.

For comparison purposes, we also prepared a filter member (Comparative Example 1) by heating a three-dimensional mesh-like metallic porous member alloyed by the same process as for Article 1 and having the same composition as the one used in preparing Article 1 in the atmosphere for three hours at 1000° C. FIGS. 1–3 are scanning electron microscopic photographs showing the surface condition of the frameworks of these members before (FIG. 1) and after (FIGS. 2 and 3) the heat treatment. While a fibrous alumina crystal grows densely on the surface of the framework of Article 1 as shown in FIG. 2, no such a fibrous crystal about 3 μm long is observed on the surface of the framework of Comparative Example 1 as shown in FIG. 3. Instead, a granulated crystal is formed.

These specimens were tested for their capacity to collect solid components (especially soot discharged from a diesel engine car) and liquid components in exhausts. Article 1 achieved much better results than Comparative Example 1.

(EXPERIMENTAL EXAMPLE 2)

A three-dimensional mesh-like metallic porous member made of Ni having an amount of 1100 g/m$^2$ and having 50 cells per inch was subjected to alloying by the diffusion process to form materials having compositions shown in Table 1. Then, these metallic porous members were heated in the atmosphere under the heating conditions specified in Table 1 to provide filter members according to the present invention (Articles 2–9).

For comparison purposes, we also prepared filter members (Comparative Examples 2–9) by heating a three-dimensional mesh-like metallic porous member having the same compositions as the materials used in preparing Articles 2–9 at a temperature lower than 800° C. or higher than 1000° C.

We also prepared comparative examples by heating a porous member containing more than 0.5% by weight of Y or Nd under the same heat treatment conditions as when preparing Articles according to the present invention.

The same fibrous crystal as observed on Article 1 was formed on the surface of the frameworks of Articles 2–9. No such crystal was found on any of Comparative Examples 2–9. Only flat crystals were observed.

The comparative specimens containing more than 0.5% by weight of Y or Nd developed a crystal having a rather short fiber length in spite of the fact that they were heated under the same conditions as with the Articles according to the present invention. This indicates that the addition of excessive Y or Nd inhibits the growth of crystals.

(EXPERIMENTAL EXAMPLE 3)

A three-dimensional mesh-like metallic porous member made of Ni having an amount of 1100 g/m$^2$ and having 50 cells per inch was subjected to alloying by the diffusion process to form materials having compositions shown in Table 1. Then, these metallic porous members were heated in a mixture of Ar and O$_2$ gases, with the partial pressure of $O_2$ kept constant at 20%, at the temperature and for the time specified in Table 2, to provide filter members according to the present invention (Articles 10–17).

For comparison purposes, we also prepared filter members (Comparative Examples 10–17) by heating three-dimensional mesh-like metallic porous members having the same compositions as the materials used in preparing Articles 2–9 at less than 800° C. or more than 1000° C. to provide Comparative Examples 10–17.

We also prepared comparative examples by heating a porous member containing more than 0.5% by weight of Y or Nd under the same heat treatment conditions as when preparing Articles 10–17.

A fibrous alumina crystal made up of fibers having a thickness of 0.2–0.3 μm and a length of 1–5 μm was formed on the surface of the frameworks of Articles 2–9. No such crystal was found on any of Comparative Examples 2–9. Only flat crystals were observed.

The comparative specimens containing more than 0.5% by weight of Y or Nd showed the same results as those in Experimental Example 2.

Then, Articles 2–9 were alternately heated and cooled 500 times, each cycle including heating at 1000° C. for 30 minutes. After the test, no problematic defects or change in appearance was observed. This experiment is a reproduction of an actual use situation in which a filter which has collected solid (such as soot) and liquid components in exhausts is periodically regenerated by burning the collected components. It was proved that the articles according to the present invention had a sufficient heat resistance.

Also, in order to examine the capacity for collecting solid exhaust components, Articles 1–9 and Comparative Examples 1–9 were actually used on a 2800-cc diesel engine car to collect "soot" in exhausts discharged therefrom. The specimens of the present invention showed a predetermined collecting rate in a shorter time than the comparative examples.

Filters of the same construction were formed from these specimens and used to collect "soot" discharged from the same diesel engine car when the engine was driven at 2600 rpm under the ¾ load. In five hours, the filters according to the present invention collected 2–5 times as much soot as Comparative Examples. Thus, it was proved that the filters of the present invention are superior in collecting capacity to comparative examples, too.

(EXPERIMENTAL EXAMPLE 4)

A catalyst (platinum-palladium) prepared by the wet method specified hereinbelow was carried on filter members formed from Articles 1 and 10–17 and Comparative Examples 1 and 10–17 to provide exhaust filter members.

We prepared alumina powder containing platinum and palladium in a dispersed state by putting 1 kg of alumina having a specific surface area of 130 m²/g into a solution which is a mixture of 10 g of dinitrodiamine platinum containing platinum and 30 g of palladium nitrate containing palladium, mixing the solution, and drying it for one hour at 150° C. and then for two hours at 400° C. One. kilogram of the alumina powder thus obtained was wet-ground to form a slurry. Three-dimensional mesh-like metallic porous members formed with a fibrous alumina crystal that correspond to Article 1 and Comparative Example 1 were immersed in the slurry thus formed. After removing excess slurry, they were dried at 150° C. for two hours and then baked at 500° C. for one hour to provide filter members carrying a catalyst according to the present invention.

Article 1 and Comparative Example 1 were tested for their catalyst carrying capacity. The test results showed that Article 1 had much higher catalyst carrying capacity than Comparative Example 1.

Also, a platinum-rhodium type catalyst was carried on the surface of the framework of Articles 10–17. The specimens thus formed were alternately heated and cooled 500 times, each cycle including heating at 1000° C. for 30 minutes. No peeling or defects of the catalyst were observed, nor was there any change in appearance. In contrast, Comparative Examples 10–17 were lower in catalyst carrying capacity than Articles 10–17. Moreover, the catalyst dropped out before the heating-cooling cycle was repeated 500 times. Thus, they were not suitable as exhaust purifying filter members.

We also tested Articles 10–17 and Comparative Examples 10–17 for their physical capacity for collecting "soot" in exhausts. We prepared filters having the same structure using specimens not having a catalyst. They were used to collect soot in exhausts discharged from a diesel engine car. The filters of the present invention showed a soot collecting capacity 2–5 times higher than the comparative examples. This indicates that the filter members having a fibrous crystal on the surface have an improved exhaust purifying capacity. This is because the catalyst is firmly carried by the fibrous crystal and such filters have a higher filtering capacity as well as purifying capacity by a catalyst.

Figure 4:
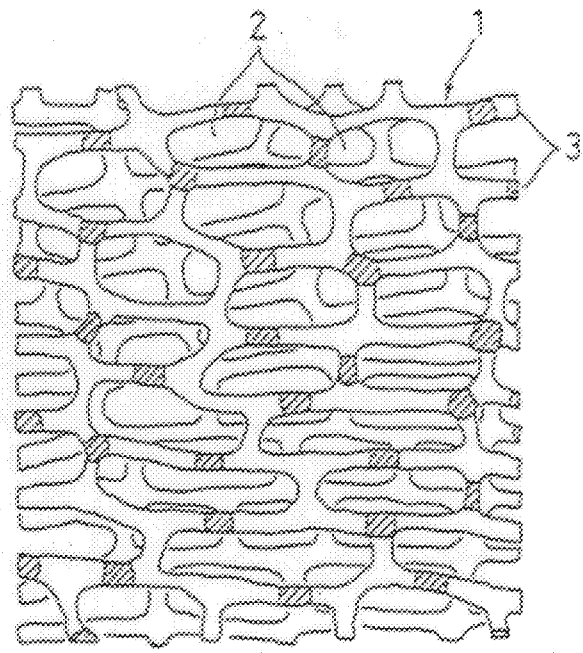
FIG. 4 is an enlarged view of a portion of the three-dimensional mesh-like porous member according to the present invention.
Figure 5:
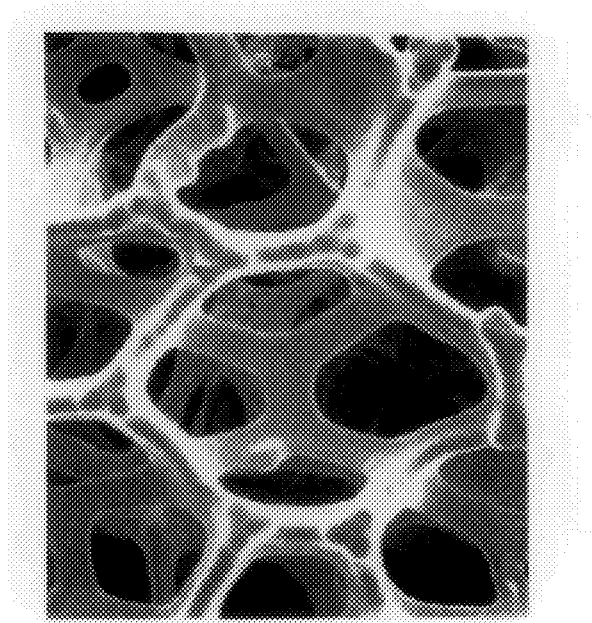
FIG. 5 is a microphotograph of the same.

In FIG. 4, numeral 1 represents the three-dimensional mesh-like porous member, number 2 indicates pores and numeral 3 indicates the framework of the porous member.

[TABLE 1]

| | Components in metallic porous member (wt %) | | | | Heat treatment conditions | |
|---|---|---|---|---|---|---|
| | Cr | Al | Y | Nd | Ni and inevitable component | Temp. (°C.) | Time (hour) |
| Article 2 | 35 | 1 | | | Remainder | 820 | 20 |
| Article 3 | 15 | 8 | | | Remainder | 850 | 10 |
| Article 4 | 20 | 6 | | | Remainder | 900 | 2 |
| Article 5 | 25 | 5 | 0.1 | | Remainder | 875 | 5 |
| Article 6 | 20 | 4 | | 0.1 | Remainder | 875 | 5 |
| Article 7 | 25 | 5 | 0.1 | 0.1 | Remainder | 875 | 5 |
| Article 8 | 20 | 5 | 0.4 | 0.1 | Remainder | 875 | 5 |
| Article 9 | 20 | 5 | 0.1 | 0.4 | Remainder | 850 | 5 |

[TABLE 2]

| | Components in metallic porous member (wt %) | | | | Heat treatment conditions | |
|---|---|---|---|---|---|---|
| | Cr | Al | Y | Nd | Ni and inevitable component | Temp. (°C.) | Time (hour) |
| Article 10 | 35 | 1 | | | Remainder | 820 | 20 |
| Article 11 | 15 | 8 | | | Remainder | 850 | 10 |
| Article 12 | 25 | 6 | 0.05 | | Remainder | 900 | 2 |
| Article 13 | 25 | 5 | 0.1 | | Remainder | 875 | 5 |
| Article 14 | 20 | 4 | | 0.1 | Remainder | 875 | 7 |
| Article 15 | 15 | 5 | 0.4 | 0.05 | Remainder | 875 | 5 |
| Article 16 | 20 | 5 | 0.1 | 0.4 | Remainder | 875 | 5 |
| Article 17 | 25 | 5 | 0.05 | 0.4 | Remainder | 850 | 7 |

What is claimed is:

1. A filter member for purifying exhausts comprising a three-dimensional metallic porous mesh comprising an Ni—Cr—Al alloy formed by diffusing Cr and Al into a three-dimensional metallic porous mesh made of Ni and unavoidable impurities, and alumina in the form of fibrous crystal formed on the surface of said porous mesh, and wherein the content of Al in said mesh is 5% or more in the region from the surface of the mesh to the depth of 0.5 μm.

2. The filter member for purifying exhausts as claimed in claim 1 wherein a catalyst is carried on said alumina.

3. The filter member for purifying exhausts as claimed in claim 1 wherein said three-dimensional metallic mesh porous comprises 15–40% by weight of Cr, 1–8% by weight of Al with the remainder being Ni and unavoidable impurities.

4. The filter member for purifying exhausts as claimed in claim 1 wherein said porous mesh further contains 0.05–0.5% by weight of at least one of rare earth elements including yttrium and neodymium.

5. The filter member for purifying exhausts as claimed in claim 2, wherein said three-dimensional metallic porous mesh comprises 15–40% by weight of Cr, 1–8% by weight of Al, with the remainder being Ni and unavoidable impurities.

6. The filter member for purifying exhausts as claimed in claim 2, wherein said porous mesh further contains 0.05 to 0.5% by weight of at least one of rare earth elements including yttrium and neodymium.

7. A method of manufacturing a filter member for purifying exhaust comprising the steps of forming a three-dimensional metallic porous mesh comprising an Ni—Cr—Al alloy by diffusing Cr and Al into a three-dimensional metallic porous mesh comprising Ni and unavoidable impurities, and heating said porous mesh in the atmosphere at a temperature of 800°–1000° C. to form alumina in the form of fibrous crystals on the surface of said porous mesh, and wherein the content of Al in said mesh is 5% or more in the region from the surface of the mesh to the depth of 0.5 μm.

* * * * *